(12) United States Patent
Bayrakdar

(10) Patent No.: US 10,641,139 B2
(45) Date of Patent: May 5, 2020

(54) CAMSHAFT ADJUSTER COMPRISING A SPRING

(71) Applicant: SCHAEFFLER TECHNOLOGIES AG & CO. KG, Herzogenaurach (DE)

(72) Inventor: Ali Bayrakdar, Roethenbach/Pegnitz (DE)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 135 days.

(21) Appl. No.: 15/758,955

(22) PCT Filed: Jul. 22, 2016

(86) PCT No.: PCT/DE2016/200339
§ 371 (c)(1),
(2) Date: Mar. 9, 2018

(87) PCT Pub. No.: WO2017/041793
PCT Pub. Date: Mar. 16, 2017

(65) Prior Publication Data
US 2019/0040771 A1    Feb. 7, 2019

(30) Foreign Application Priority Data
Sep. 10, 2015   (DE) .................. 10 2015 217 261

(51) Int. Cl.
*F01L 1/34*       (2006.01)
*F01L 1/344*      (2006.01)
(Continued)

(52) U.S. Cl.
CPC .............. *F01L 1/3442* (2013.01); *F16F 1/18* (2013.01); *F16H 53/04* (2013.01);
(Continued)

(58) Field of Classification Search
CPC ................ F01L 1/3442; F01L 2250/02; F01L 2001/34483; F01L 2001/34433;
(Continued)

(56) References Cited

U.S. PATENT DOCUMENTS 5,870,983 A * 2/1999 Sato .................... F01L 1/34406
123/90.17
6,651,430 B2  11/2003 Meier et al.
(Continued)

FOREIGN PATENT DOCUMENTS

CN    101196131 A    6/2008
CN    103380270 A    10/2013
(Continued)

OTHER PUBLICATIONS

International Search Report for International Application No. PCT/DE2016/200339 dated Jul. 22, 2016, 5 pages.
(Continued)

*Primary Examiner* — Zelalem Eshete
(74) *Attorney, Agent, or Firm* — Brooks Kushman P.C.

(57) ABSTRACT

A camshaft adjuster, comprising a drive element and an output element, wherein the drive element can be rotated in relation to the output element within an angular range between an early and a late position. The camshaft adjuster also includes a spring configured to brace the drive element with the output element, wherein the spring is configured to rotate the drive element in relation to the output element into a desired position within the angular range and is further configured to angularly adjust from both an early position and a late position into a direction of the desired position.

20 Claims, 5 Drawing Sheets

(51) Int. Cl.
*F16F 1/18* (2006.01)
*F16H 53/04* (2006.01)

(52) U.S. Cl.
CPC ............... *F01L 2001/34433* (2013.01); *F01L 2001/34463* (2013.01); *F01L 2001/34483* (2013.01); *F01L 2101/00* (2013.01); *F01L 2250/02* (2013.01); *F01L 2810/04* (2013.01)

(58) Field of Classification Search
CPC ......... F01L 2001/34463; F01L 2101/00; F01L 2810/04; F16H 53/04; F16F 1/18
See application file for complete search history.

(56) References Cited

U.S. PATENT DOCUMENTS

| | | |
|---|---|---|
| 7,703,426 B2 | 4/2010 | Weber |
| 9,441,506 B2 | 9/2016 | Janitschek et al. |

| | | | |
|---|---|---|---|
| 2001/0032606 A1 | 10/2001 | Pierik | |
| 2010/0139593 A1 | 6/2010 | Takemura | |

FOREIGN PATENT DOCUMENTS

| | | | |
|---|---|---|---|
| DE | 10062184 C1 | 7/2002 | |
| DE | 102006004760 A1 | 10/2007 | |
| EP | 2199548 A1 | 6/2010 | |
| EP | 2302177 A1 | 3/2011 | |
| JP | 2015124754 A | 7/2015 | |
| WO | 9203637 A1 | 3/1992 | |
| WO | 2006043683 A1 | 4/2006 | |
| WO | WO-2012056874 A1 * | 5/2012 | ............ F01L 1/3442 |

OTHER PUBLICATIONS

Office Action for Chinese Application No. 201680051710.4, dated Jul. 3, 2019, 6 pages.

* cited by examiner

CAMSHAFT ADJUSTER COMPRISING A SPRING

CROSS-REFERENCE TO RELATED APPLICATIONS

This application is the U.S. National Phase of PCT/DE2016/200339 filed Jul. 22, 2016, which claims priority to DE 102015217261.9 filed Sep. 10, 2015, the entire disclosures of which are incorporated by reference herein.

TECHNICAL FIELD

The disclosure relates to a Camshaft Adjuster.

BACKGROUND

Camshaft adjusters are used in internal combustion engines to vary the timing of the combustion chamber valves so that it is possible to vary the phase relation between a crankshaft and a camshaft within a defined angular range, between a maximum early and a maximum late position. Adjusting the timing according to the actual load and rotation speed reduces fuel consumption and emissions. For this purpose, camshaft adjuster are integrated into a drive train, which a torque is transmitted from the crankshaft to the camshaft. This drive train may be designed as e.g. a belt, chain or gear drive.

In a hydraulic camshaft adjuster, the output element and the drive element form one or more pairs of mutually acting pressure chambers, which can be pressurized by use of hydraulic fluid. The drive element and the output element are arranged coaxially. By filling and emptying individual pressure chambers, a relative movement between the drive element and the output element is generated. The spring, which is rotatively issuing its force between the drive element and the output element, pushes the drive element into an advantageous direction in relation to the output element. This advantageous direction can be the within the same, or opposite to the rotation direction.

One construction type of a hydraulic camshaft adjuster is the vane cell adjuster.

The vane cell adjuster comprises a stator, a rotor and a drive wheel with an external toothing system. The rotor is mostly designed as the output element in such a way that it can be coupled to the camshaft for joint rotation. The drive element comprises the stator and the drive wheel. The stator and the drive wheel are coupled for joint rotation or are alternatively designed as one piece. The rotor is arranged coaxially towards the stator and within the stator. The rotor and the stator with their vanes, which extend radially, create oil chambers that operate in a contrary manner, which can be pressurized by using oil and allow for a relative rotation between the stator and the rotor. The vanes are either designed together in one piece with the rotor or the stator or are arranged as "inserted wings" within designated slots of the rotor or the stator. The vane cell adjusters furthermore comprise various sealing lids. The stator and the sealing lids are secured together by multiple screw connections.

Another type of a hydraulic camshaft adjuster is the axial piston adjuster. An adjusting element is hereby axially moved by using oil pressure, which generates a relative rotation between a drive element and an output element via helical gears.

A further design-form of a camshaft adjuster is the electromechanical camshaft adjuster, which comprises a three-shaft gearbox (for example, a planetary gearbox). One of the shafts hereby forms the drive element and a second shaft forms the output element. Rotation energy can be supplied to or dissipated from the system via the third shaft by using an adjusting device such as an electric motor or a brake. A spring can be additionally arranged, which supports or resets the relative rotation between the drive element and the output element.

The DE 100 62 184 A1 shows a spiral torsion spring of a camshaft adjuster. Both ends of the spiral spring are radially bent towards the outer side. The first bent end rests on a fixed pin that protrudes from the chain sprocket, and the second bent end rests on a pin that protrudes from a vane gate. The spiral spring is pushing the vane rotor in such a way, that the vane rotor is hurrying ahead in relation to the chain sprocket. This means that the spiral spring is pushing the vane rotor to such an extent, that one camshaft is hurrying ahead in relation to a motor crankshaft.

The DE 10 2006 004 760 A1 shows two springs in two pressure chambers of a camshaft adjuster, wherein there is one respective spring in each pressure chamber that pushes on the vane and correspondingly causes an adjustment from the direction "early" or "late".

As shown in FIG. 16A and FIG. 16B, the EP 2 302 177 A1 shows a spring, which can push the rotor in relation to the stator into an angular position for the combustion engine in the case when there is a pressure drop in the pressure chambers, so that it can be started again.

SUMMARY

It is the objective of the disclosure to provide a camshaft adjuster, which comprises a spring that moves the rotor, generally referred to as an output element, in relation to the stator, generally referred to as a drive element, into a desired position, wherein a particularly reliable and simple positioning should be made possible from both, an "early" as well as from a "late" position.

In accordance with the disclosure, this objective is achieved by the disclosure set forth below.

The disclosure thus provides a camshaft adjuster that comprises a drive element and an output element, wherein the drive element can be rotated in relation to the output element within a defined angular range between an early and a late position, wherein a spring braces the drive element with the output element, the spring being a single spring of the camshaft adjuster, which can rotate the drive element in relation to the output element into a desired position within the angular range, wherein the single spring can cause an angular adjusting both from an early as well as from a late position into the direction of the desired position, wherein the desired position is defined by a stop element, which is in contact with the two spring ends of the single spring.

The desired position can be an intermediate position between "early" and "late", in particular it may be the middle position.

The output element can particularly be a rotor, with vanes for use in a hydraulic vane cell adjuster, with or without an adapter section. The output element may be coupled to a camshaft for joint rotation, in particular by using a central screw or a central valve.

The drive element may feature a toothing system for an engagement with a traction mechanism of the timing assembly. The toothing system can be designed in such a way that it is directly connected to the drive element or via e.g. a cover element, which is connected to the drive element for joint rotation. The drive element can be designed as a stator with vanes in order to be used in a hydraulic vane cell adjuster.

In camshaft adjusters that are actuated in a hydraulic manner, the drive element comprises at least one cover element in order to seal the pressure chambers, so that the pressurized hydraulic fluid cannot leak out of the pressure chambers.

Of course, the drive element and the output element can also be the elements of an electromechanical camshaft adjuster.

Common for all types of camshaft adjusters, including those not explicitly mentioned here, is the use of a spring in order to ensure a reliable angular adjusting in a controlled or preferably uncontrolled operating state of the camshaft adjuster and also of the internal combustion engine by using a "startable" and/or a position that needs to be locked, in order that the internal combustion engine can be restarted again.

Advantageously, a reliable desired position within the angular range can both be achieved as well as maintained by resting both spring ends onto one stop element at the same time, which may be preferably a single stop element. Vibrations between the output element and the drive element in the desired position or out of the desired position, which are caused e.g. by using alternating moments of the camshaft or which are transmitted from the timing assembly onto the camshaft adjuster, which lead to a deflection out of this desired position, are directly eliminated by using the simultaneous and especially backlash-free attachment of two spring ends of the single spring to the stop element, and the output element is immediately and safely returned to the desired position and calmed in the case of a vibration-induced deflection out of the desired position. The simultaneous contact of both spring ends of the single spring onto the stop element reduces the necessary structural measures for a reliable attachment of the single spring in the camshaft adjuster to a minimum. The simultaneous contact of each spring end to the stop element in the desired position reduces the manufacturing tolerances to a minimum, in particular at the stop element, which also have an effect on the desired position, by using a locking mechanism can advantageously secure the desired position in a particularly reliable manner in a mechanically way. As a result, the play between a locking element, which can engage into a locking slot in order to secure the angular position, can be reduced in both circumferential directions, by means of which it is possible to reduce noise as well, especially when the internal combustion engine starts.

According to the disclosure, it is possible to approach an intermediate or ideally a center position by using one single spring within the camshaft adjuster, wherein this position can be secured in a more reliable and accurate manner for the securing of a locking mechanism by using the attachment of both spring ends on one stop element. Apart from the possibility of a reliable securing, the disclosure ensures that this desired position can be reached when the engine stops. This is a particularly advantageous, since in the event of an engine stop, especially an unplanned engine stop, the energy and resources that are necessary for an adjusting are no more longer available, by means of which this task can be performed and is being performed by the spring in an independent manner.

In one embodiment of the disclosure, the stop element is formed by the drive element or by the output element. The stop element can be arranged between the two spring ends of the single spring. Alternatively, the stop element can flank the two spring ends, so that the spring ends are surrounded by the stop element or that the spring ends are arranged within the stop element. Alternatively, the stop element can be arranged on the same side of the spring ends, wherein the stop element flanks both ends of the spring on one side.

In addition to the stop element, it is possible to arrange for at least one contact element, which can deflect at least one spring end from the single spring from the desired position. In this case, the existing contact element can be provided for the deflection of the other spring end, wherein both spring ends come in contact at the stop element in the resting position (desired position). Advantageously, the desired position can also be selected within the area of the "early" or "late" position between the drive element and the output element.

There is thus a further embodiment of the disclosure, which is that the stop element is also the contact element of one spring end at the same time, wherein for the other spring end, an additional contact element is provided for the deflection of the spring end from the resting position. Subsequently, the other spring end will find its contact position at the contact element of the one spring end.

Alternatively, it can be advantageous if there are two contact elements in addition to the one contact element, wherein each spring is assigned to one respective contact element, which can carry out the deflection of this respective spring end. When the resting position (desired position) is reached, both spring ends can leave their respective contact elements and both can come in contact with the stop element, ideally at the same time.

It is also possible that one spring end changes its contact from the contact element to the stop element. Upon reaching the resting position (desired position), the spring end can leave its respective contact element and come in contact with the stop element. The other spring end can already be in contact with both, the contact element as well as the stop element or exclusively with the stop element or the contact element.

In one advantageous embodiment, the stop element comprises two contact elements by which the one single spring is tensioned, so that a position between the desired position and the position early or late can be reached.

The stop element itself can consist of two contact elements, wherein the spring is tensioned by the contact elements and a stop element is realized at the same time via the contact elements. Advantageously, it is thus possible to reduce the amount of components.

The before-mentioned embodiments for the allocation of the stop element and of the contact element(s) with regard to the spring ends in connection with the contacting situation in the resting position can be combined in any desired manner with each other and with the entire content of the disclosure, and are therefore hereby expressly disclosed.

In one particularly preferred embodiment, the first contact element is connected to the drive element for joint rotation and the second contact element is connected to the output element for joint rotation. The firm connection for joint rotation can be carried out directly or indirectly, e.g. via an intermediate cover element.

The shape of the contact elements, particularly for the contact surface that is arranged for the spring end, can be cylindrical, spherical, polygonal or ball-shaped. The contact elements can be separate components such as e.g. screws, screw heads, needles, pins, that are aligned with the drive element or with the output element. The contact elements can also be formed as integral parts of the drive element or output element or from parts of the drive element or output element. The drive element or output element can hereby be made of sheet metal, sinter or plastic material at the position of the contact element.

In one embodiment of the disclosure, the contact elements are formed as pins, wherein the pins are arranged in such a way that they are aligned in radial direction. The pins can be designed in one piece with the respective drive element or output element, wherein it is advantageous to use pins that can be inserted into respective receiving provisions of the drive element or output element. Since the pins are made with a significantly low diameter tolerance, it is thus possible to achieve a very symmetrical contact of the spring ends to the contact elements.

The pins can be made with different or equal diameters. It is also possible that the contact element features a pin-shaped form, if it is designed as separate part from the contact elements.

In one advantageous embodiment, both spring ends of the single spring touch the two contact elements in the desired position. It is thus possible to achieve a transfer condition of the one spring end to the other spring end via the two contact elements that does not have any clearance at the desired position. Advantageously, at least one contact element is a stop element. In an advantageous manner, it is thus possible to prevent inconsistencies in the characteristic curve of the single spring, which could lead to a negative noise development.

In another embodiment of the disclosure, both spring ends are resting against the two contact elements with a pretensioning. The spring ends are thus shaped and placed at the contact elements as well as at the stop element in such a way, that they feature a pretensioning, independent of the pretensioning of the spring body. Advantageously, at least one contact element is a stop element. This pretensioning produces the effect, that the arising vibrations out of the resting position (desired position) can be reduced by using the pretensioning. In the same manner, the spring ends can feature different pretensionings, which are adapted to the arising unsymmetrical vibrations out of the desired position.

In one embodiment of the disclosure, the single spring features two characteristic curves that are different from the other, wherein one respective characteristic curve is assigned to one respective spring body of the single spring, wherein each spring body is tensioned when there is a movement out of the desired position in the direction of the position early or late. It is possible that the torque in a first angular position of the one spring body is different from the torque in a second angular position of the other spring body. The characteristic curve of the one spring body can be different from the characteristic curve of the other spring body, in order to e.g. counteract a camshaft friction moment. The characteristic curves can also be selected differently. It is thus possible to have progressive or degressive curves. Progressive characteristic curves can be advantageous to increase the adjusting speed in particular in the vicinity of the position "early" and/or "late". Degressive characteristic curves can be advantageous to achieve a dampening or a soft contacting in the position "early" and/or "late". The characteristic curve is to be understood with a view from the desired position into the direction of the position "early" or "late". If the one spring body features a degressive and the other one a progressive characteristic curve, it is possible to specifically influence the behavior when there is an unplanned interruption of the energy and of operating means, which cause a displacement. A mainly linear characteristic curve is also possible in order to e.g. produce a consistent angular speed during the adjusting, with or without operating means and energy. Progressive and degressive characteristic curves can be adjusted to the operating behavior of the operating means, e.g. the oil of the oil pump, in order to achieve a better response behavior of the camshaft adjuster or a smoother operating behavior or an improved locking behavior of the camshaft adjuster.

Alternatively, both characteristic curves can either be progressive or degressive or mostly linear.

In a further embodiment of the disclosure, the single spring is accommodated at a bearing element, which separates the two spring bodies of the single spring spatially from each other. The bearing element can additionally form a flexible connection to the spring, wherein the spring can furthermore be held by using the stop element and/or the contact element. The bearing element can assume an axial securing of the spring, so that the spring is held in axial direction in such a way that it cannot slip out and thus, no cover element may be necessary to seal the spring. A safe attaching can furthermore be guaranteed by using the bearing element, if the spring wire is wound around the bearing element. The winding of the wire may range between 180° and 360°, but it can also be a plurality of 360°. (several windings). The winding can be subject to a pretensioning, which accomplishes that an axial slipping, and/or a radial slipping of the single spring is prevented and that the single spring will reliably stay in its position. This winding can be expanded during the mounting, so that a positioning or placing of the single spring is possible with or on the bearing element.

In one advantageous embodiment, the bearing element is attached to the drive element or to the output element for joint rotation. The bearing element can be formed as a pin or stud separately from the drive element or output element and can be attached to it during the mounting procedure. A one-piece construction of the bearing element with the drive element or with the output element is also possible. In this case, production methods such as sintering or sheet metal forming are practical, in which the bearing element is formed as a sintered console or as a curved lug.

By using the arrangement in accordance with the disclosure of one single spring and of the stop element, wherein the spring can press or pull from either the direction "early" or from "late" into any desired position between "early" and "late", a safe and extremely simple positioning into any desired position is achieved, especially for a reliable securing of a locking mechanism.

BRIEF DESCRIPTION OF THE DRAWINGS

Embodiments of the disclosure are depicted in the Figures.

It is shown.

DETAILED DESCRIPTION

Figure 1:
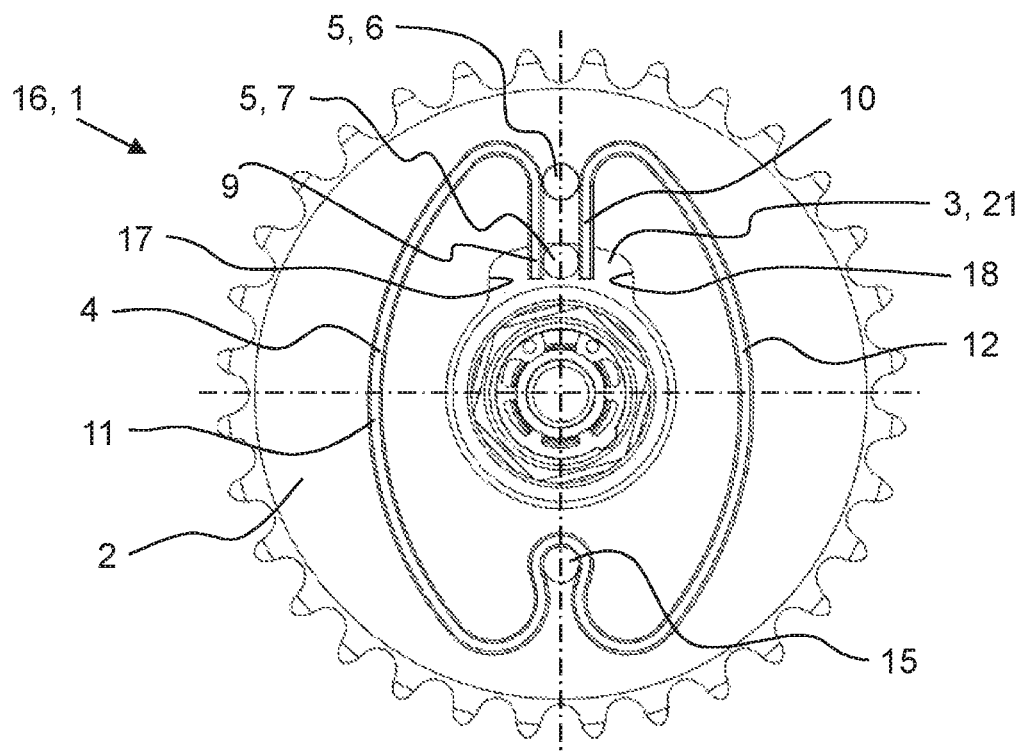
FIG. 1 a camshaft adjuster according to the disclosure with a first design-form of the spring, FIG. 2 a perspective depiction of the camshaft adjuster according to FIG. 1, FIG. 3 the camshaft adjuster according to FIG. 1 with a spring that is tensioned using the adjusting procedure, FIG. 4 the perspective depiction of the camshaft adjuster according to FIG. 3, FIG. 5 a camshaft adjuster according to the disclosure with a second design-form of the spring, FIG. 6 a perspective depiction of the camshaft adjuster according to FIG. 5, FIG. 7 a camshaft adjuster according to the disclosure with a third design-form of the spring, FIG. 8 a perspective depiction of the camshaft adjuster according to FIG. 7, FIG. 9 a first characteristic curve of a spring of the camshaft adjuster according to the disclosure and FIG. 10 a second characteristic curve of a spring of the camshaft adjuster according to the disclosure.

FIG. 1 depicts a camshaft adjuster 1 according to the disclosure with a first design-form of spring 4. The camshaft adjuster 1 comprises a drive element 2 and an output element 3. The drive element 2 features the configuration that is known from the prior art with a toothing system and at least one cover element for a hydraulic camshaft adjuster. The output element 3 also features the configuration that is known from the prior art with e.g. inserted vanes for a hydraulic camshaft adjuster.

The camshaft adjuster 1 according to the disclosure comprises one single spring 4 on one of its end faces, which is mounted on a bearing element 15. Bearing element 15 is formed as a pin that is connected to drive element 2 in such a way that it cannot turn. The single spring 4 features an eyelet-shaped course of the spring wire in the area of bearing element 15, which encloses bearing element 15 so that a firm attaching of the single spring 4 is guaranteed in radial direction. The enclosing can be subject to a pretensioning, so that any clearance between the enclosing spring wire and bearing element 15 is eliminated. But it can still be possible to enable a swivel motion between the single spring 4 and bearing element 15. The two arch-shaped spring bodies 11, 12 of the single spring 4 converge at bearing element 15.

A stop element 5 is furthermore formed on camshaft adjuster 1, which is divided into two pin-shaped contact elements 6 and 7. Stop element 5 has the task to absorb the spring tension of one of the spring bodies 11 or 12, so that when a movement occurs from "early" or "late", drive element 2 is stopped and held in the desired position 16 in relation to output element 3. By using the design-form of the single spring 4 according to the disclosure, only one stop element is necessary to accomplish this, since spring 4 is tensioned when a change out of the desired position occurs. But in the embodiments according to the FIGS. 1 to 8, stop element 5 is divided into the two contact elements 6 and 7. The spring ends 9, 10 touch stop element 5 with their sides that are facing towards each other. Stop element 5 is thus located between the two spring ends 9, 10.

Contact element 6 is connected to drive element 2 for joint rotation and the contact element 7 is connected to output element 3 for joint rotation. One of the contact elements 6 or 7 can be moved within a recess 21 of drive element 2 or of output element 3. In this embodiment, contact element 7 can be moved within a recess 21 of drive element 2, since contact element 7 is connected to output element 3 for joint rotation. It is the function of the contact elements 6 and 7 to tension the respective spring body 11, 12 when a movement occurs of drive element 2 in relation to output element 3 out of the desired position 16, depending if it will be in the direction "early" or "late". When the internal combustion engine is turned off, spring 4 causes an adjusting from "early" or "late" back into the direction of the desired position 16. Alternatively, when there is a movement of drive element 2 in relation to output element 3 out from the direction "early" or "late", the contact elements 6, 7 can tension the respective spring body 11, 12 into the direction of the desired position 16. When the internal combustion engine is turned off, spring 4 causes an adjusting back into the direction "early" or "late". At least one spring end 10 will rest on contact element 6 or 7. But spring end 10 can also rest on both contact elements 6 and 7 at the same time. Spring end 9, 10 is formed as a straight section, which is subsequent to the arc-shaped spring body 11, 12. Spring ends 9, 10 flank the contact elements 6, 7 that are arranged between the two spring ends 9, 10.

Figure 2:
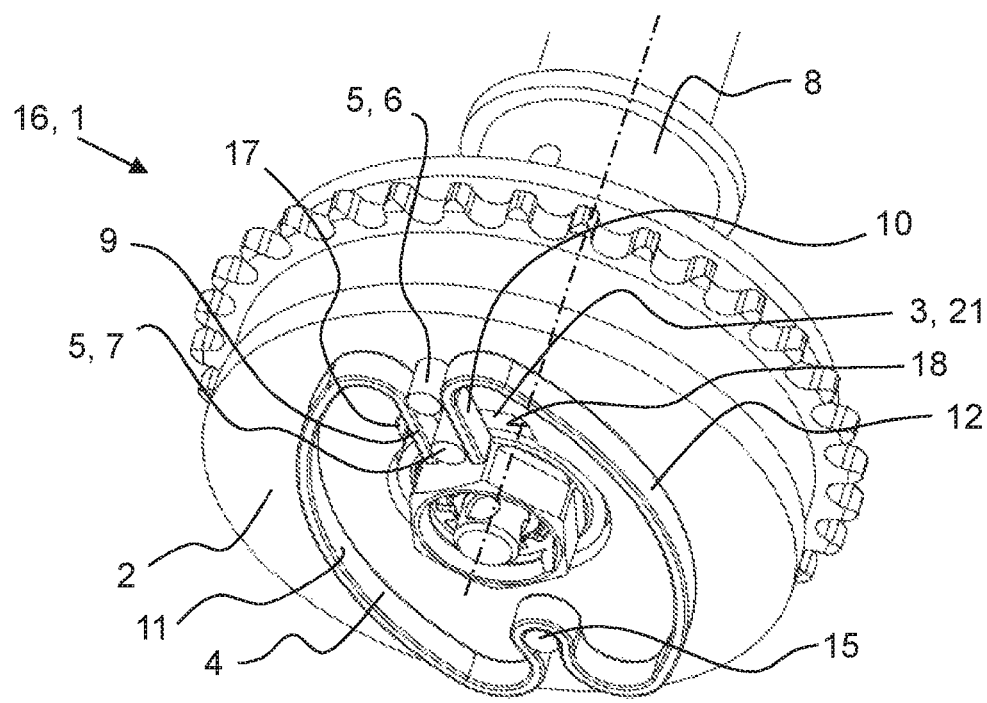

FIG. 2 depicts a perspective view of camshaft adjuster 1 according to FIG. 1. Camshaft 8 is clearly visible, to which output element 3 is connected for joint rotation. Single spring 4 is arranged on the side of camshaft adjuster 1 that is facing away from the camshaft. Advantageously, it is thus easier to control the proper fit of spring 4 at camshaft adjuster 1 during the mounting of camshaft adjuster 1 with the camshaft 8. It can also be clearly seen that contact element 6 is connected to a cover element that is formed from drive element 2 for joint rotation. When the cover element is screwed to the rest of the drive element 2, it is thus advantageously possible to carry out a circumferential adjusting via contact elements 6 and the two spring ends 9, 10 that are resting on it, wherein the adjusting is ideally successful if the position of both contact elements 6, 7 is radially aligned.

Figure 3:
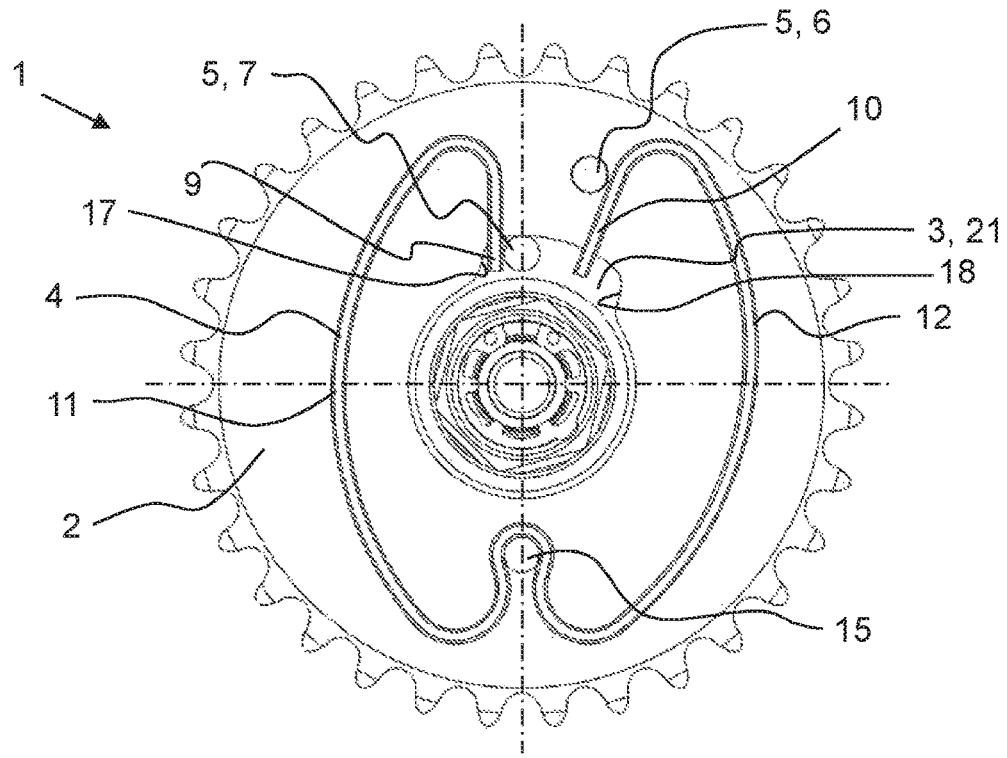

FIG. 3 depicts camshaft adjuster 1 according to FIG. 1 with a spring 4 that is tensioned by using an adjustment procedure. In this embodiment it is assumed that the drive direction of drive element 2 occurs clockwise. Since drive element 2 is hurrying ahead of output element 3 in its angular position—which can be clearly seen in the position of the contact elements 6, 7—or that output element 3 is lagging behind in relation to drive element 2 in its angular position, an adjusting of camshaft adjuster 1 into the direction "late" has occurred. Since both contact elements 6, 7 are no longer aligned in radial direction, the spring bodies 11, 12 are tensioned. The two spring ends 9, 10 are distanced from each other in circumferential direction. It is hereby possible that the enclosing angle of the spring wire around bearing element 15 increases. Recess 21 is formed on drive element 2 for joint rotation, the pin-shaped contact element 7 thus moves within the recess in circumferential direction until it touches on the first limit stop 17 or until e.g. the vanes of drive element 2 and of output element 3 hit against each other within camshaft adjuster 1. Advantageously, the angular limitation of the maximum allowed adjusting range should be realized by use of recess 21, since a hitting against each other of the vanes will lead to problems such as durability and an overlapping of the openings for the oil supply in the pressure chambers.

Figure 4:
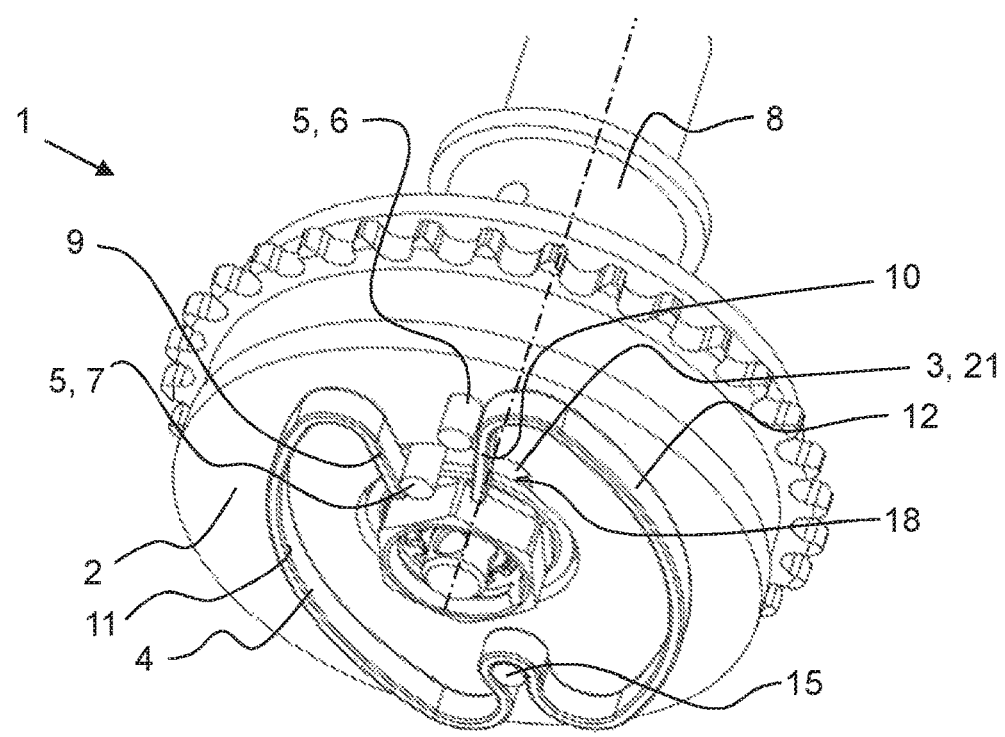

FIG. 4 depicts the perspective view of camshaft adjuster 1 according to FIG. 3. The same state is depicted, as it was already described in FIG. 3. The structural arrangement of spring 4 corresponds to the description of FIG. 2.

Figure 5:
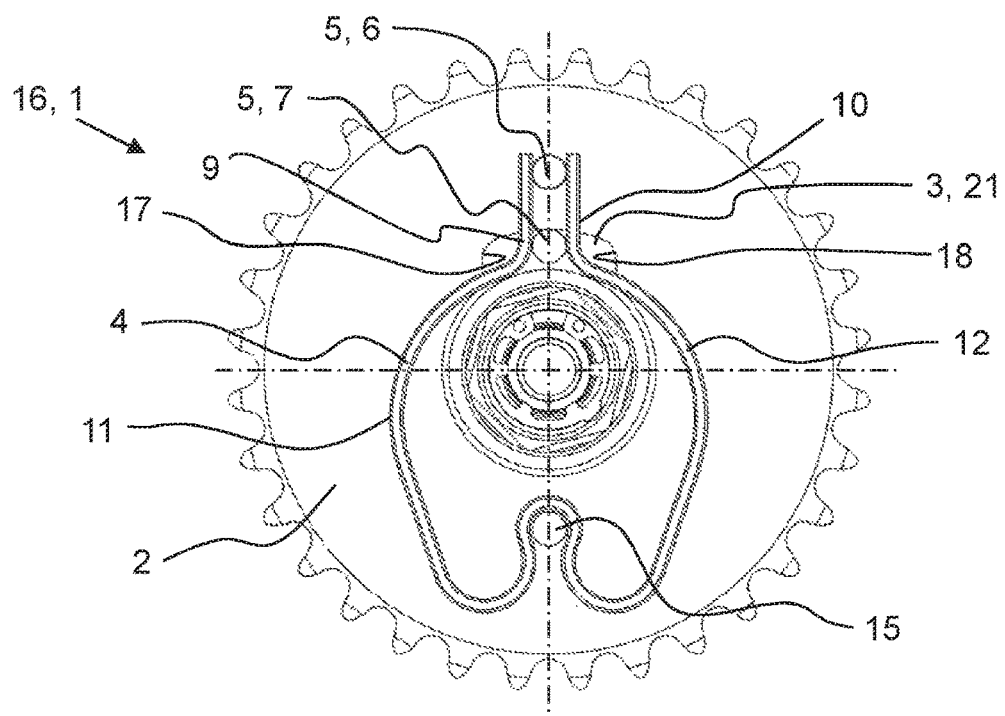

FIG. 5 depicts a camshaft adjuster 1 according to the disclosure with a second design-form of spring 4. The configuration largely corresponds to the configuration that was described in the FIGS. 1 to 4. The differences from the first embodiment are explained in the following. FIG. 5 depicts a second design-form of spring 4, which differs from the first embodiment of spring 4 in the area of the spring ends 9, 10. According to the FIGS. 1 to 4, the spring ends 9, 10 begin, starting from the respective spring body 11, 12 with a larger diameter than the actual end of the spring wire of the spring ends 9, 10. In other words, the spring ends 9, 10 in the FIGS. 1 to 4 extend radially towards the inside, or directed towards the rotation axis of camshaft adjuster 1. But in the FIGS. 5 and 6, the spring ends 9, 10 extend in radial direction starting from the spring bodies 11, 12 towards the outside, or away from the rotation axis of camshaft adjuster 1. The advantage of this is that the spring bodies 11, 12 can first of all be arranged and designed in the shortest distance to the rotation axis of camshaft adjuster 1, in order to simplify access to the screws that attach the cover element with the rest of drive element 2. At the same time, the bending beam of the respective contact element 6, 7 to bearing element 15 is reduced, whereby the spring rate and spring moment is increased. If the spring rate is to be reduced, more bendable material can be included in the respective spring bodies 11, 12, e.g. by use of a formation of several elastic windings. In this second design-form of spring 4, the spring rate is also influenced in a certain way by use of the elastic spring end 9, 10 at contact element 6. When compared to the first design-form of spring 4, this effect occurs at contact element 7, which has a lower radial distance than contact element 6. The formation of the spring ends 9, 10, of the spring bodies 11, 12 and the radial distances of the contact elements 6, 7 towards the rotation axis of camshaft adjuster 1 as well as towards each other thus have an influence on the characteristic curve of the single spring 4. In order to achieve a most congruent characteristic curve of the spring bodies 11 and 12, it is possible that e.g. the two contact elements 6, 7 feature a very small distance towards each other. By use of the radial arrangement of the pin-shaped contact elements 6, 7, it is furthermore possible to influence the dimensioning and durability of the contact elements 6, 7, wherein a lower radial distance of both contact elements 6, 7 towards each other leads to a similar dimensioning of the pin-shaped contact elements 6, 7.

Figure 6:
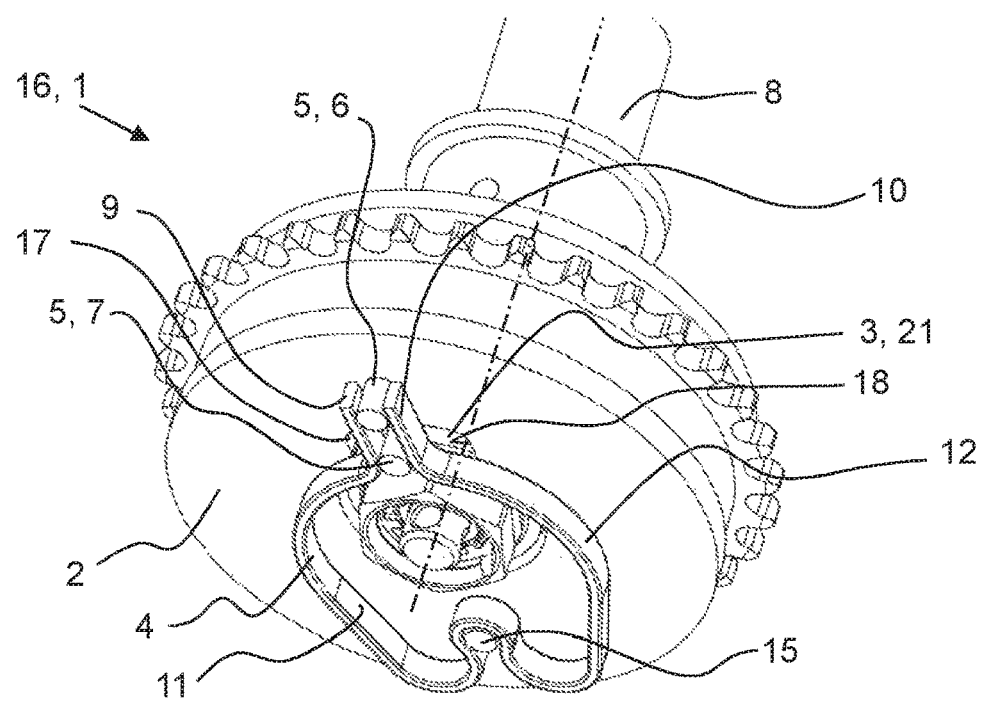

FIG. 6 depicts a perspective view of camshaft adjuster 1 according to FIG. 5. Single spring 4 is arranged on the side of camshaft adjuster 1, which is facing away from the camshaft. Spring 4 features enough clearance in the area of the rotation axis of camshaft adjuster 1, so that a center screw, with or without valve function, can be mounted, in order to fix camshaft adjuster 1 to camshaft 8 for joint rotation.

As in the previous Figures, the spring wire of spring 4 features a rectangular cross section, by which a linear contact is advantageously achieved when it rests against a cylindrical contact element 6, 7, which increases the lifespan of this contact. The same effect occurs at bearing element 15, wherein the winding of the spring wire of spring 4 significantly increases the lifespan at this bearing position. Between contact element 7, which is designed in a cylindrical shape and which is arranged within recess 21, and the first as well as second limit stop 17, 18, the load is also distributed on a line in case of a contact, of which deformations of contact element 7 are reduced and the lifespan, as well as precision, of the contact is increased.

Figure 7:
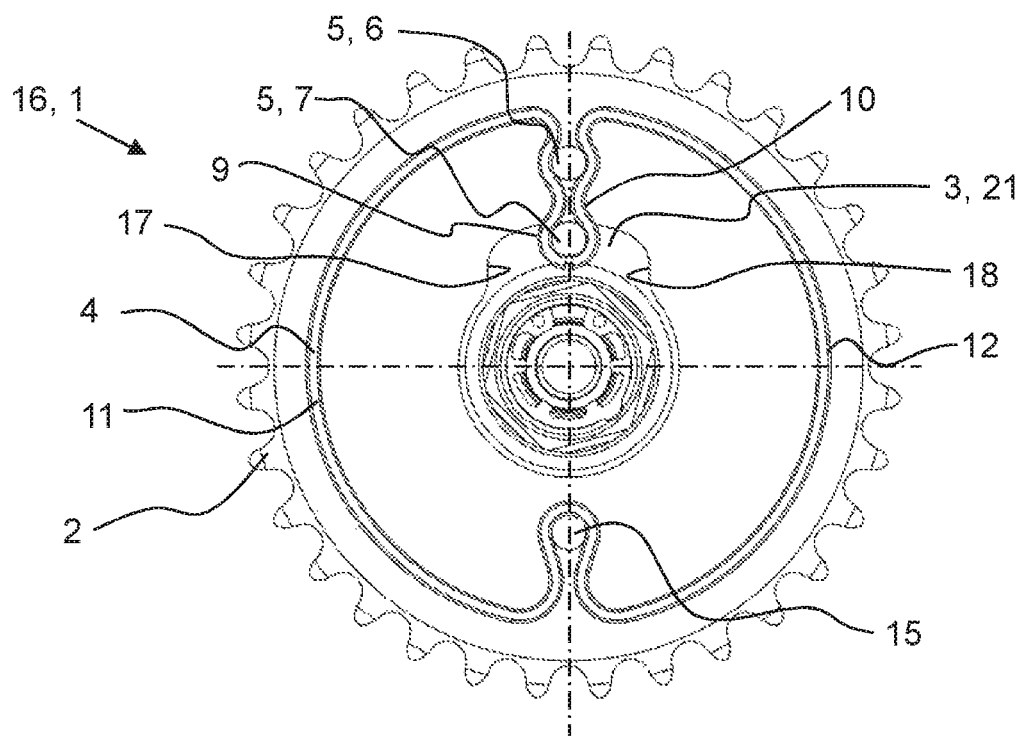

FIG. 7 depicts a camshaft adjuster 1 according to the disclosure with a third design-form of spring 4. In contrast to the first and second design-form of spring 4, the contact elements 6, 7 are enclosed by the spring wire of spring 4, by which allow the load in the contact is further reduced. The spring ends 9, 10 are furthermore secured at the contact elements 6, 7 in radial direction, so that a slipping, in particular of contact element 7 with regard to the spring wire, can be prevented. A slipping may occur when the spring body 11, 12 is tensioned by using contact element 7, wherein the contact between spring end 9 or 10 and contact element 7 can move onto the spring wire. If the length of the spring wire of spring end 9, 10 is not sufficiently provided or if the spring body 11, 12, which is tensioned, is subjected to vibrations during the operation of the combustion engine, there is the danger of a loss of contact and a failure of camshaft adjuster 1. By enclosing at least one element pair—contact element 6, 7 and spring end 9, 10—it is possible to prevent a loss of contact. It is furthermore possible to omit bearing element 15 and the two spring bodies 11, 12 can be mounted in an overhung position above the two wave-shaped spring ends 9, 10.

Figure 8:
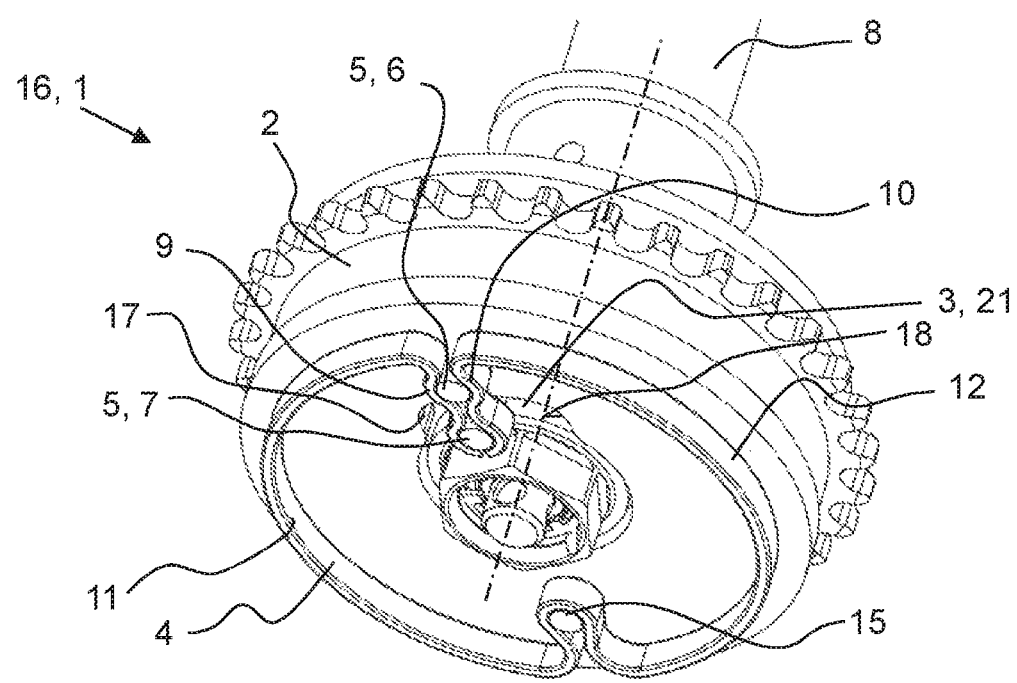

FIG. 8 depicts a perspective view of camshaft adjuster 1 according to FIG. 7. In the same way as in FIGS. 2, 4 and 6, spring 4 is arranged on the side of camshaft adjuster 1 that is facing away from the camshaft. Alternatively, an arrangement of spring 4 on the side of camshaft adjuster 1 that is facing towards the camshaft is also possible, wherein spring 4 along with the spring ends 9, 10 as well as with the spring bodies 11, 12 should have enough space so that spring 4 can reach all the way through the camshaft 8—in this case spring 4 reaches around camshaft 8.

Figure 9:
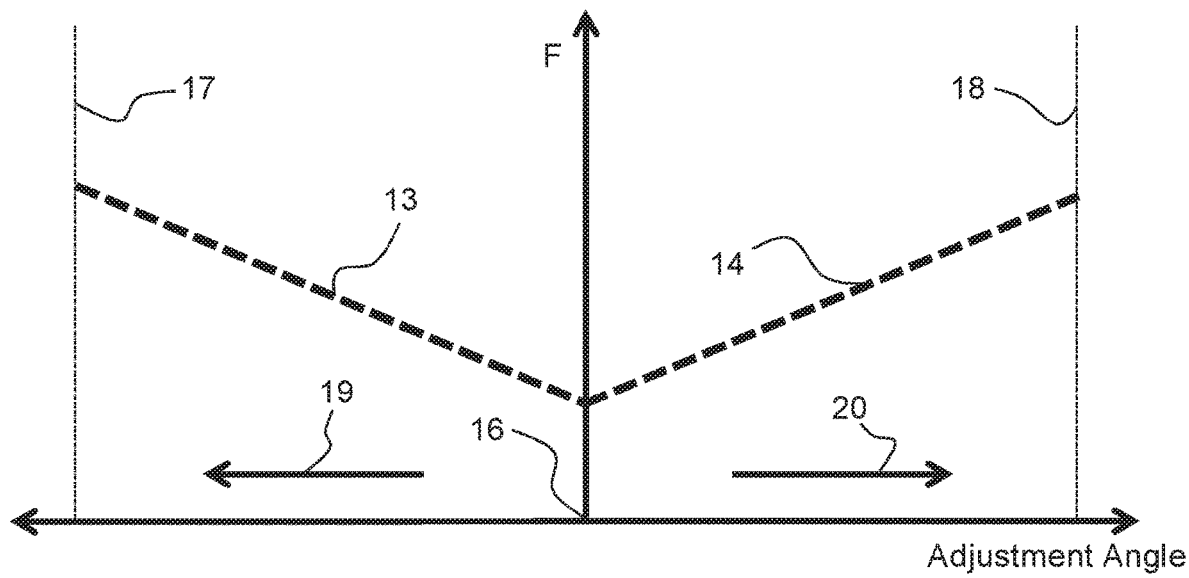

FIG. 9 depicts a first characteristic curve of a spring 4 of camshaft adjuster 1 according to the disclosure. The spring moments that are produces by the spring bodies 11, 12 are in an equilibrium state when they are in the desired position 16. The desired position 16 is an angular position, in which the drive element 2 is located relative to the output element 3 approximately on the bisecting line of an angle within the maximum possible angular range. Alternatively, other positions are also possible for the desired position 16, in which at least the ability to start the combustion engine is improved or made possible in the first place. The first and the second adjusting direction 19, 20 correspond to a turning of drive element 2 in relation to output element 3 clockwise or counter-clockwise in the preceding Figures. The vertically dashed lines 17, 18 symbolize the respective first or second limit stop 17, 18. Spring 4 has no effect beyond these lines, since contact element 7 will either rest against the first limit stop 17 or at the second limit stop 18 within recess 21. The first and the second limit stop 17, 18 thus determine the maximum angular range for an adjusting between drive element 2 and output element 3. This maximum angular range can alternatively also be realized by using a limit stop that is located internally of the camshaft adjuster, such as by using the vanes of drive element 2 and output element 3 in the construction form of a camshaft adjuster 1 as a vane cell adjuster.

The largely linear course of the first and of the second characteristic curve 13, 14 is remarkable, wherein one respective characteristic curve 13 or 14 is assigned to one spring body 11 or 12. The force or the torque rises with increasing adjusting angle from the desired position 16 in a consistent and monotonous way.

Figure 10:
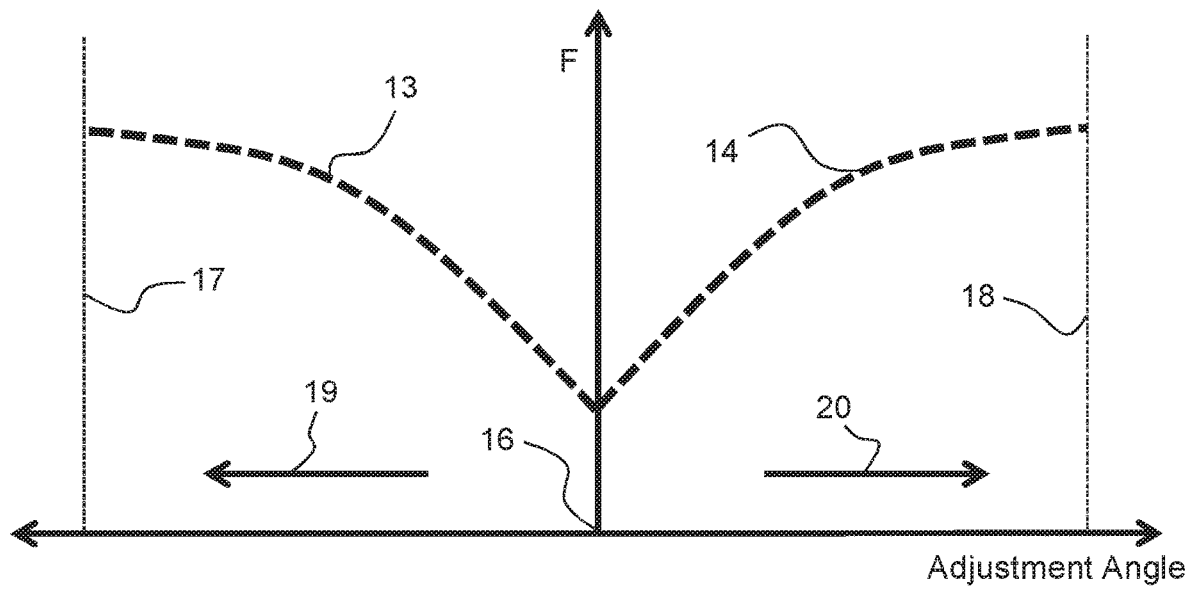

FIG. 10 depicts a second characteristic curve of a spring 4 of camshaft adjuster 1 according to the disclosure. This characteristic curve differs from the one shown in FIG. 9 in that it depicts a non-linear course, in particular a degressive course. A degressive course has the advantage, that the change of the angular speed is reduced in the area of the first or second limit stop 17, 18 and thus there is a soft contacting of element 7 with the first or second limit stop 17, 18. A progressive characteristic curve is alternatively possible, by means of which in particular the adjusting speed is high in the area of the limit stops 17, 18. This is advantageous if e.g. a locking is to occur between drive element 2 and output element 3 in the desired position 16, wherein this should be carried out as fast as possible from the limit stop positions 17, 18, but where the locking in the area of the desired position 16 should be carried out very reliably. In the degressive characteristic curve that is depicted in FIG. 10, it is possible that there is a locking in one or both limit stop positions 17, 18, in order to lock in a reliable manner, but where, in particular in case of an engine stop, the desired position 16 is to be reached as fast and as reliable as possible for a subsequent restart of the combustion engine within a short time. Advantageously, the arrangement of the contact elements 6, 7 and of the stop element 5 according to the disclosure, facilitate this previously described effect.

LIST OF REFERENCE NUMBERS 1) camshaft adjuster
2) drive element
3) output element
4) single spring
5) stop element
6) first contact element
7) second contact element
8) camshaft
9) first spring end
10) second spring end
11) first spring body
12) second spring body
13) first characteristic curve
14) second characteristic curve
15) bearing element
16) desired position
17) first limit stop
18) second limit stop
19) first adjusting direction
20) second adjusting direction
21) recess

The invention claimed is:

1. A camshaft adjuster, comprising:
a drive element and an output element, wherein the drive element can be rotated in relation to the output element within a defined angular range between an early and a late position, wherein a spring braces the drive element with the output element, wherein the spring is a single spring of the camshaft adjuster that is configured to rotate the drive element in relation to the output element into a desired position within the angular range, wherein the spring is configured to angularly adjust from an early position and from a late position into a direction of the desired position defined by a stop element in contact with two spring ends of the spring.

2. The camshaft adjuster of claim 1, wherein the stop element is either formed from the drive element or the output element.

3. The camshaft adjuster of claim 2, wherein the stop element includes first and second contact elements tensioning the single spring if a position between the desired position and the early position or the late position is reached.

4. The camshaft adjuster of claim 3, wherein the first contact element is connected to the drive element for joint rotation and the second contact element is connected to the output element for joint rotation.

5. The camshaft adjuster of claim 3, wherein the contact elements are formed as pins aligned in radial direction.

6. The camshaft adjuster of claim 3, wherein a first spring end and second spring end of the single spring touch the two contact elements in the desired position.

7. The camshaft adjuster of claim 6, wherein the first spring end and the second spring end are resting against the two contact elements with a pretensioning.

8. The camshaft adjuster of claim 1, wherein the single spring includes two characteristic curves that are different from one another, wherein each respective characteristic curve is assigned to one respective spring body of the single spring, wherein each spring body is tensioned when there is a movement out of the desired position into the direction of the early position or late position.

9. The camshaft adjuster of claim 1, wherein the single spring is accommodated at a bearing element, which separates two spring bodies of the single spring from each other.

10. The camshaft adjuster of claim 9, wherein the bearing element is connected to the drive element or to the output element for joint rotation.

11. A camshaft adjuster, comprising:
a drive element and an output element, wherein the drive element can be rotated in relation to the output element within an angular range between an early and a late position;
a spring of the camshaft adjuster configured to brace the drive element with the output element, wherein the spring is configured to rotate the drive element in relation to the output element into a desired position within the angular range and is further configured to angularly adjust from both an early position and a late position into a direction of the desired position; and
a stop element in contact with two spring ends of the spring.

12. The camshaft adjuster of claim 11, wherein the desired position is defined by the stop element in contact with the two spring ends of the single spring.

13. The camshaft adjuster of claim 12, wherein the stop element includes two contact elements, wherein the spring is tensioned by the contact elements.

14. The camshaft adjuster of claim 11, wherein the spring is accommodated at a bearing element that separates two spring bodies of the spring spatially from each other.

15. The camshaft adjuster of claim 14, wherein the bearing element is attached to the drive element.

16. The camshaft adjuster of claim 14, wherein the bearing element is attached to the output element.

17. The camshaft adjuster of claim 11, wherein the spring includes a first and second characteristic curve, wherein the first and second characteristic curve are respectively assigned to a first spring body and second spring body of the spring.

18. The camshaft adjuster of claim 11, wherein the stop element includes first and second contact elements configured to move within a recess of the drive element.

19. A spring for a camshaft adjuster, comprising:
a first end and a second end, wherein the spring is a single spring having only a single winding and configured to rotate a drive element in relation to an output element into a desired position within an angular range defined between an early position and a late position, and is further configured to angularly adjust from both an early position and a late position into a direction of the desired position defined by a stop element in contact with the first end and second spring end.

20. The spring of claim 19, wherein the stop element includes first and second contact elements configured to move within a recess of the drive element.

* * * * *